Figure 1:
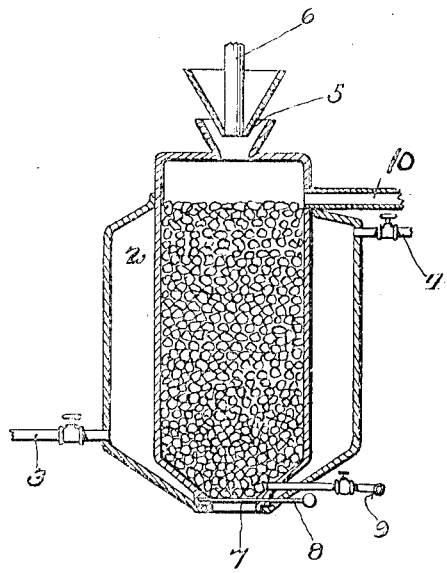

D. F. SMITH & H. ESSEX.
PROCESS OF MAKING ALUMINUM CHLORID.
APPLICATION FILED JUNE 22, 1917.

1,270,226.

Patented June 18, 1918.

Inventors
Dillon F. Smith,
Harry Essex.

Witness

By

Attorney

UNITED STATES PATENT OFFICE.

DILLON F. SMITH AND HARRY ESSEX, OF PITTSBURGH, PENNSYLVANIA, ASSIGNORS TO GULF REFINING COMPANY, OF PITTSBURGH, PENNSYLVANIA, A CORPORATION OF TEXAS.

PROCESS OF MAKING ALUMINUM CHLORID.

1,270,226. Specification of Letters Patent. Patented June 18, 1918.

Application filed June 22, 1917. Serial No. 176,325.

*To all whom it may concern:*

Be it known that we, DILLON F. SMITH and HARRY ESSEX, citizens of the United States, residing at Pittsburgh, in the county of Allegheny and State of Pennsylvania, have invented certain new and useful Improvements in Processes of Making Aluminum Chlorid, of which the following is a specification.

This invention relates to processes of making aluminum chlorid; and it comprises a method of making aluminum chlorid wherein aluminum carbid or a reaction mixture comprising aluminum carbid, (and in some instances aluminum carbid or such a reaction mixture together with carbon and bauxite, or similar material) is subjected to the action of chlorin or a gas containing chlorin, such for instance as hydrochloric acid (HCl) with the production of aluminum chlorid due to the exothermic reaction resulting from the contact of the gas with the reaction material.

Aluminum chlorid is a material which is valuable in many arts because of its high reactivity. It is also valuable as a source of aluminum. The methods of producing it however which have heretofore been proposed and used render the material unduly costly. The most convenient way and one which is often used is to pass chlorin over or through metallic aluminum. This however adds the relatively high cost of metallic aluminum to the cost of the finished material, and of course precludes any use of the aluminum chlorid as a source of aluminum. Aluminum chlorid may also be made by passing chlorin over alumina, for example dehydrated bauxite, in the presence of carbon or other reducing material at a high temperature. The temperature necessary, taken in connection with the necessity for retort materials which will simultaneously resist the activity of carbon, of chlorin and of aluminum chlorid at these temperatures renders this operation also expensive and difficult. In converting alumina to aluminum chlorid with carbon and chlorin, the charge of mixed alumina and carbon must of necessity be open and pervious to permit efficient contact with the chlorin and this of course prevents free conduction of heat, so that in practice the retort walls must be very highly heated to maintain the necessary temperature in the charge.

In the present invention we have devised a method of producing aluminum chlorid which obviates the noted heating disadvantages, and secure certain new advantages enabling us in certain cases even to use iron and steel apparatus for reaction chambers.

As our starting material instead of using bauxite or metallic aluminum we employ aluminum carbid or an electric furnace product containing the same. Bauxite however may be advantageously used as an addition to the carbid in some instances.

Aluminum carbid, $Al_4C_3$, is readily produced by the reduction of alumina and carbon in the electric furnace. Unless special precautions are taken however it is not readily obtained as a pure material; the electric furnace more readily producing materials containing aluminum carbid but not composed wholly of it, being more or less dissociated. Such material may hereinafter be called a crude reaction mixture. At a temperature just above that at which aluminum carbid forms, it again dissociates with production of free carbon and free aluminum, the latter occurring as minute globules or particles distributed through a skeleton of carbon and unchanged carbid. This dissociation may reach as high as 50 per cent. of the original carbid and it seems to be facilitated catalytically by the presence of impurities derived from the bauxite and coke. The electric furnace product also contains the impurities of the original raw materials, (coke and bauxite) and it may contain an excess of alumina or of carbon as the case may be. It may also contain more or less aluminum nitrid and aluminum sulfid, both of which are useful bodies for the present purposes.

In the present invention while we may use pure aluminum carbid made in the electric furnace or otherwise, we find it more advantageous to use the crude reaction mixtures produced in the furnace as above described. Aluminum carbid reacts readily with both chlorin and HCl gas (hydrochloric acid) forming aluminum chlorid. The action is energetic and attended with liberation of heat; the amount of heat liberated with chlorin being greater than that given with HCl. In both cases however the amount of heat given out and the energy of reaction is such as to cause the reaction to be self-propagating and self-maintaining after being once initiated. With the crude dissociated electric furnace products mentioned the action is even more energetic than it is with the pure aluminum carbid; possibly because of the existence of the finely divided particles of metallic aluminum in it spaced and isolated by the free carbon.

We take advantage of this development of heat and avoid the necessity of heating through a retort wall. Using chlorin, the reaction begins at a temperature as low as 200° C and will continue at this temperature if the mixture be cooled, although the temperature tends, of course, to rise higher. As iron is not attacked by dry chlorin at moderate temperatures, up to say, 200° C. in a good embodiment of our invention we can place a charge of aluminum carbid or of the crude reaction mixture from the electric furnace, which is better, in an iron container of any suitable kind or size and pass in chlorin, either the solid material or the chlorin being heated up to temperature of about 200° C. To initiate the reaction, it is sufficient to heat the charge at one point within it to 200° C. This may be accomplished by any convenient means. Reaction at once starts in with production of vapors of aluminum chlorid. Or the reaction may be initiated easily and conveniently by placing in the charge a small quantity, (a few grams will suffice) of powdered metallic antimony or other body capable of exothermic reaction with chlorin at ordinary temperatures. Antimony reacts with chlorin at ordinary temperatures and the heat evolved in the reaction heats up neighboring portions of the charge to a temperature at which reaction between chlorin and the charge begins. Once initiated, the large quantity of heat liberated in the reaction may cause the temperature within the reaction vessel to become very high. The rise of temperature is not in any way objectionable save in so far as the possibility of injury to the retort walls is concerned where these walls are made of iron or steel. Therefore in using iron or steel, we simply keep the walls of the receptacle cool, letting the temperature in the interior of the mass go as high as it will. Cooling, may be by a water jacket, steam jacket etc. In so doing, we obtain a clean, complete conversion of the aluminum carbid or the reaction-furnace mixture without injury to the reaction vessel or contamination of the aluminum chlorid with iron from it.

The small amount of aluminum chlorid which remains condensed as a thin layer on the cooled walls of the reaction chamber if this cooling be below the condensing temperature of aluminum chlorid, say 175° C., may be, if desired, sublimed off at the end of a run by draining the water from the water jacket, so allowing the walls to attain a temperature sufficient to affect the volatilization. Or, better, the aluminum chlorid on the walls may be volatilized at the end of the run by replacing the water in the jacket with steam under pressure. Steam may be used directly as a temperature controlling means. As steam has a high latent heat, it acts effectually to control the temperature of the retort walls to around 200° C., at which the reaction will become initiated and continue while aluminum chlorid will not condense and iron will not be attacked. Methods of cooling other than those indicated may be employed; the important point is that the mixture shall, at some point within it, attain a temperature of about 200° C. to initiate the reaction and after the reaction begins that the excess developed heat be dissipated or taken up in so far as may be necessary to protect the walls of the reaction vessel. Where the walls are of silicious material such as clay, and not of iron or steel, cooling is of course not so important. If the reaction vessel is made of clay or the like there is of course no objection to allowing the temperature in the reaction mixture to go as high as may be desired. In such a case artificial cooling may be dispensed with.

We regard this performance of the reaction under wall-cooling conditions as practically quite important since it enables the use of ordinary iron and steel vessels and connections; but in some embodiments of our invention we do not cool at all, but utilize the heat of reaction instead of dissipating it. This may be done by incorporating with the charge of aluminum carbid (or reaction mixture containing it) a certain amount of alumina and carbon; enough to absorb and utilize the excess of heat over and above that necessary to keep the reaction between the aluminum carbid and the chlorin (or the HCl, as the case may be,) going. As already noted, a mixture of alumina and carbon reacts with chlorin with absorption of heat, or endothermically, while the carbid reacts with chlorin with development of heat, or exothermically. And in a mixed charge the two effects counterbalance more or less. The heat developed by the reaction of the chlorin with the aluminum carbid is then utilized to cause formation of more aluminum chlorid from the bauxite and coke. In operating in this way we do not ordinarily cool the mixture; we may indeed heat insulate the walls of the reaction chamber. For example, we may place a clay reaction vessel in a brick casing with more or less kieselguhr or mineral wool between the two.

Instead of using aluminum carbid itself, we can as stated advantageously use various crude reaction mixtures from the electric furnace produced, for example, by heating bauxite or dehydrated bauxite with coal or any other form of carbon. The use of clays and other alumina-containing materials is less advantageous than the use of bauxite. Sulfate of alumina is another material which may be used. Mixed with carbon and treated in the electric furnace the sulfate is converted into a variable mixture of sulfid and carbid of aluminum with more or less metallic aluminum. Sulfid of aluminum will act with chlorin to form chlorin in the present process.

In an advantageous embodiment of the present invention we may mix alumina, such as dehydrated bauxite, with finely divided carbon of any suitable kind. Ordinarily, we employ about 75 per cent. of carbon calculated on the amount of alumina ($Al_2O_3$) present. Lampblack, oil coke, anthracite, charcoal, etc., may be used as a source of carbon. Purity of the carbon is not very material here. The mixture may be briqueted with a little tar or it may be granulated or used in any other convenient physical form. It is desirable that the mixture should be intimate. If bauxite is used, it should be first dehydrated and the materials should be as dry as possible. The mixture is then subjected to the action of heat developed by the electric current, either an alternate or continuous current, in any suitable ordinary type of electric furnace. The action of the heat in the furnace is to produce carbon monoxid, which may be collected and used in any suitable manner, and aluminum carbid, the latter usually subsequently dissociating to a greater or less extent with production of free aluminum and free carbon. The product is rather unstable in contact with air, moisture breaking up the carbid. If stored it should therefore be kept in tight containers. This material we comminute or granulate and place in any suitable type of retort which may be of iron, clay, silica or other suitable material and bring to a temperature above the vaporizing temperature of aluminum chlorid. The chlorin or chlorin-containing gas is then passed through the charge.

If the reaction in the electric furnace is not carried to completion, unchanged alumina and carbon of course still remain, and we often cut short the reaction purposely. Obviously it is not necessary to carry the conversion in the electric furnace further than is sufficient to form enough aluminum carbid to insure the conversion of the rest of the charge to chlorid by treatment with chlorin. We therefore interrupt the heating at the point desired, remove the charge, thoroughly intermingle it, grinding if necessary, and then treat with chlorin in a reaction chamber protected against loss of heat.

Instead of using the reaction mixture from the electrolytic furnace, we may of course use aluminum carbid produced in any suitable manner. As stated, however pure aluminum carbid, which is a more difficult material to make than the described reaction mixture, is in any case not as desirable, and particularly with HCl.

We may use chlorin from any convenient source, such as commercial liquid chlorin, the dried gases from the anode chamber of an electrolytic cell electrolyzing salt, etc. Whatever the source of the chlorin or the gases comprising chlorin, they should be dry.

In the claims in this case, by the words "gases comprising chlorin" we mean to include chlorin itself; the gas mixture containing chlorin coming from the electrolytic cell, such weak chlorins as are produced in the Deacon process and dry HCl gas which is a composition comprising chlorin. The whole operation may easily be made continuous in that by the use of an electric furnace, aluminum carbid or a mixture comprising aluminum carbid, can be continuously formed, removed and somewhat cooled to bring it down to, say 200° C., and then treated with chlorin in a suitable chamber, continuing the cooling if necessary to keep down the heat developed. In so doing, the process is continuous, alumina, carbon and chlorin being supplied at various points with continuous production of aluminum chlorid. Cooling down the reaction mixture from the electric furnace to 200° C. prior to contact with chlorin is convenient and advantageous but not strictly necessary, since the hot mixture from the furnace may be treated directly with gases comprising chlorin. But in manufacturing aluminum chlorid from the reaction mixture with chlorin at very high temperatures the corrosive action on the materials of the reaction chamber is of course much more energetic. For this reason, cooling down somewhat is advantageous; and the whole aluminum chlorid formation may be under cooling conditions.

The aluminum chlorid produced is substantially pure but may be resublimed to free it of small amounts of other chlorids.

The same reaction may be applied for the manufacture of the double chlorid of aluminum and sodium, which is a particularly convenient material for the manufacture of metallic aluminum by electrolysis. In so doing, it is merely necessary to mix the reaction product from the electric furnace with the proper amount of sodium chlorid and expose to the action of chlorin as before. The volatilizing temperature of sodium aluminum chlorid being higher than that of aluminum chlorid, the operation requires somewhat higher temperatures. It is otherwise the same.

Instead of using a mixture of alumina and carbon (such as bauxite and coke) to absorb excess heat chemically with production of aluminum chlorid, certain residues obtained in the purification and treatment of petroleum oils and materials with aluminum chlorid may be so employed. Aluminum chlorid is a material exercising a violent chemical action of a catalytic nature upon petroleum oils; and it may be used in their treatment in a variety of ways. It may for example be used to convert unsaturated lubricating oil into saturated material by warming the oil with the chlorid for a time; it may be used to convert high boiling oils into gasolene by boiling such oils therewith, etc., etc. In all these uses after a time the aluminum chlorid loses its high activity and becomes converted into a coky or sludgy mass which contains Al and Cl in the correct proportions of $AlCl_3$ but no longer acts catalytically. These residues on heating in the presence of a limited amount of chlorin give off vapors of aluminum chlorid in a condition fit for reuse. As to the condition in which the aluminum and chlorin exist in these residues, there is no definite knowledge. For the present purposes however such residues may be considered the equivalent of the alumina-carbon mixtures already stated in that they may be mixed with aluminum carbid to take up and utilize a portion of the excess heat generated by the action of chlorin.

In the use of hydrochloric acid HCl gas, the reaction upon aluminum carbid is also highly exothermic, giving out more heat than is necessary to take care of it and obviating the necessity for any heating of the charge by conveyance of heat through the walls of the reaction chamber. While we find the use of chlorin more advantageous than that of HCl because of cost considerations and because the whole operation is simpler and easier, yet HCl may be employed. The temperature at which the reaction becomes initiated however is considerably higher than is the case where using chlorin, and not so much extra bauxite and coke can be used. After being once initiated however the reaction will take care of itself. The reaction may be started by heating a little aluminum carbid to 400 or 500° C. and placing it in a reaction chamber of any suitable kind and leading in dry HCl gas. The mixture will heat up because of the formation of aluminum chlorid and more aluminum carbid may be fed to the reaction chamber, becoming heated up to the reaction initiating temperature by the heat developed from the first portion.

Either way of operating, with chlorin or with HCl may easily be made continuous, the solid reaction mixture being fed into and through a suitable reaction chamber continuously with aluminum chlorid vapors withdrawn at one end and carbon, etc., withdrawn at the other. After the reaction is once started, it takes care of itself.

In the accompanying drawings we have shown two types of apparatus for carrying out our invention. In these drawings, Figure 1 is a vertical section through one form of apparatus; and Fig. 2 is a similar view through another form.

Referring particularly to Fig. 1, element 1 indicates a retort having the jacket 2 with inlet 3 and outlet 4. The retort may be kept cool by the admission of water or steam at 3 and removal at 4. This retort may be made of iron or steel, since it may be maintained at a temperature at which such substances are not attacked by the chlorin. A hopper 5 is provided at the top of the retort with a valve 6 for controlling the feed of the solid reaction material thereto. The material after it has been spent may be removed at 7 through the gate 8. Chlorin or hydrochloric acid or other gas containing chlorin may be admitted at 9. It passes upwardly into or through the reaction material which may be either stored therein as a charge or which may be continuously admitted through 5 with removal of residues at 7, forming aluminum chlorid vapors which are removed at 10 and conducted to a condenser. The reaction material may be in the form of granules, fragments or bricks, as desired.

Figure 2:
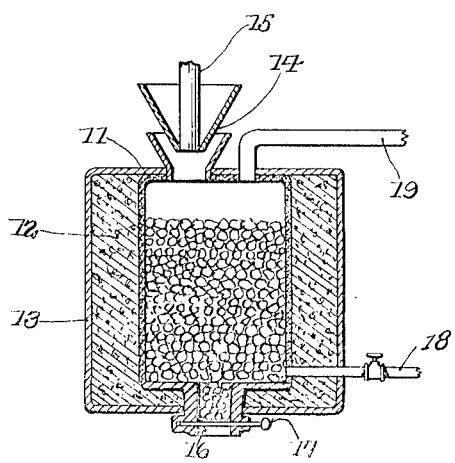

In the apparatus shown in Fig. 2 the retort 11 is made of firebrick or other refractory material provided with heat isulating walls 12, having a steel or iron jacket 13. The reaction mixture is introduced through 14 and the feed controlled by the valve 15. Feed may be continuous or a charge may be introduced from time to time as is the case with Fig. 1. Residues are either continuously or intermittently removed from the apparatus through the discharge end 16 provided with the gate 17. The mixture fed may be aluminum carbid or the furnace product containing aluminum carbid with some free metallic aluminum; and in either case, it may be mixed with bauxite and coke or with the aluminum chlorid residues described. Chlorin or a chlorin-containing gas is introduced through 18 and the aluminum chlorid formed removed at 19 and conducted to a suitable condenser (not shown).

In both of the figures the mixture is first ignited, or the gas is temporarily preheated before admission. The reaction being an exothermic one, the mixture in the retort does not need heating from outside sources. The apparatus of Fig. 2 is particularly advantageous for use in connection with a mixture containing the bauxite and carbon, or with the incompletely furnaced material from the electric furnace.

What we claim is:—

1. The process of making aluminum chlorid which comprises exposing an electric furnace product comprising aluminum carbid and free aluminum to the action of a gas comprising chlorin at a temperature sufficient to sublime aluminum chlorid, abstracting heat from the mixture during the reaction, and removing and condensing the vapors of aluminum chlorid produced.

2. The process of making aluminum chlorid which comprises subjecting material containing alumina to the action of carbon in amounts sufficient to reduce said alumina and form aluminum carbid in an electric furnace until a crude reaction mixture containing aluminum carbid and dissociated aluminum carbid is produced, subjecting such reaction mixture to the action of a gas comprising chlorin at a temperature at which action will take place and aluminum chlorid will vaporize and condensing and recovering the vapors produced.

3. The process of producing aluminum chlorid which comprises exposing dehydrated bauxite to the action of carbon in an electric furnace, treating the reaction mixture thus produced with chlorin while maintaining a temperature not materially above 175° C. and condensing and collecting the vapors produced.

4. The process of making aluminum chlorid which comprises treating aluminum carbid with chlorin at a temperature somewhat above but not materially above the volatilizing point of aluminum chlorid and condensing and collecting the vapors produced.

5. The process of producing aluminum chlorid which comprises exposing material containing alumina to the action of carbon in an electric furnace to produce a material comprising aluminum carbid, subjecting the reaction mixture to the action of chlorin in a reaction chamber maintained at temperatures not materially above 175° C., and condensing and collecting the vapors produced.

6. The process of producing aluminum chlorid which comprises reacting upon a material comprising alumina with carbon at electric furnace temperatures in subjecting the product of reaction to a treatment with a gas comprising chlorin at a temperature sufficient to remove the produced aluminum chlorid in the vapor form while abstracting the excess heat of reaction over and above that necessary to maintain such temperature.

7. The process of producing aluminum chlorid which comprises reacting upon alumina with carbon in the electric furnace to make a reaction mixture containing aluminum and aluminum carbid, bringing the mixture to a temperature of about 200° C., contacting with chlorin, and abstracting heat of reaction to maintain the temperature at about 200°.

8. The process of producing aluminum chlorid which comprises reacting upon alumina with carbon in the electric furnace to make a reaction mixture containing aluminum carbid and dissociated aluminum carbid, placing such mixture in a vessel at a temperature of about 200° C., and leading in chlorin to produce aluminum chlorid under cooling conditions adapted to keep the temperature of such vessel below 200° C.

9. The method of making aluminum chlorid which comprises reacting with a solid charge comprising aluminum carbid with a gas comprising chlorin while maintaining such charge at the reaction temperature by means of the heat generated in the reaction.

10. The method of making aluminum chlorid which comprises reacting with a solid charge comprising aluminum carbid, carbon and alumina with chlorin while maintaining such charge at the reaction temperature by means of the heat generated in the reaction of the carbid and the chlorin.

11. The method of making aluminum chlorid which comprises reacting with a solid charge comprising aluminum carbid with chlorin while maintaining such charge at the reaction temperature by means of the heat generated in the reaction, excess of such heat being dissipated by cooling of such charge.

12. In the manufacture of aluminum chlorid in an iron vessel the process which comprises initially heating a mixture comprising aluminum carbid and carbon in such vessel, leading a gas comprising chlorin through such mixture, and allowing the reaction to proceed while controlling the temperature of reaction to prevent attack of the iron vessel by the chlorin.

13. In the manufacture of aluminum chlorid by passing a gas containing chlorin through a material comprising aluminum carbid the process which comprises maintaining the temperature of the reaction below 200° C.

14. The process of making aluminum chlorid which comprises reacting with chlorin upon a charge mixture containing sufficient aluminum carbid to permit the reaction to go forward without supply of heat.

15. In the manufacture of aluminum chlorid, the process which comprises passing a gas comprising chlorin over aluminum carbid under cooling conditions.

16. In the manufacture of aluminum chlorid, the process which comprises passing chlorin over aluminum carbid under cooling conditions.

17. In the manufacture of aluminum chlorid, the process which comprises passing a gas comprising chlorin over crude aluminum carbid under cooling conditions.

18. In the manufacture of aluminum chlorid, the process which comprises passing chlorin over crude aluminum carbid under cooling conditions.

In testimony whereof, we affix our signatures.

DILLON F. SMITH.
HARRY ESSEX.